United States Patent
Ganesan et al.

(10) Patent No.: US 10,572,701 B2
(45) Date of Patent: Feb. 25, 2020

(54) RFID READING WRISTBAND

(71) Applicant: University of Massachusetts, Boston, MA (US)

(72) Inventors: Deepak Ganesan, Amherst, MA (US); Ali Kiaghadi, Amherst, MA (US); Pan Hu, Palto Alto, CA (US); Jeremy Gummeson, Belchertown, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 16/153,520

(22) Filed: Oct. 5, 2018

(65) Prior Publication Data
US 2019/0108375 A1 Apr. 11, 2019

Related U.S. Application Data

(60) Provisional application No. 62/569,150, filed on Oct. 6, 2017.

(51) Int. Cl.
*G06K 7/10* (2006.01)

(52) U.S. Cl.
CPC ..... *G06K 7/10396* (2013.01); *G06K 7/10316* (2013.01)

(58) Field of Classification Search
CPC ............... G06K 7/10396; G06K 7/10316
USPC ............................................. 235/451
See application file for complete search history.

(56) References Cited

U.S. PATENT DOCUMENTS

| | | | |
|---|---|---|---|
| 7,306,141 B1* | 12/2007 | Schwarz, Jr. | G06Q 10/08 235/375 |
| 9,928,342 B1* | 3/2018 | LaBorde | A61B 5/6852 |
| 9,984,262 B2* | 5/2018 | Schutz | H04M 1/7253 |
| 10,014,967 B2* | 7/2018 | Xie | G06K 9/00288 |

\* cited by examiner

*Primary Examiner* — Michael G Lee
*Assistant Examiner* — David Tardif
(74) *Attorney, Agent, or Firm* — Schwegman Lundberg & Woessner, P.A.

(57) ABSTRACT

Systems and techniques for a low power wrist-worn RFID reader capable of reading RFID tags within the area of a localized personal body network. The wrist-worn reader provides a means for tracking how a user interacts with their environment. The wrist-worn reader may distinguish between tagged objects within the range of the reader and objects held by the user. The reader may also distinguish when a tagged object has been picked up and when it has been released.

20 Claims, 11 Drawing Sheets

US 10,572,701 B2

RFID READING WRISTBAND

CLAIM OF PRIORITY

This patent application claims the benefit of priority, under 35 U.S.C. § 119, to U.S. Provisional Patent Application Ser. No. 62/569,150, titled "RFID Reading Wristband," filed on Oct. 6, 2017, which is hereby incorporated by reference herein in its entirety.

TECHNICAL FIELD

The disclosure generally relates to wireless communication with a limited range to measure personal human interaction.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
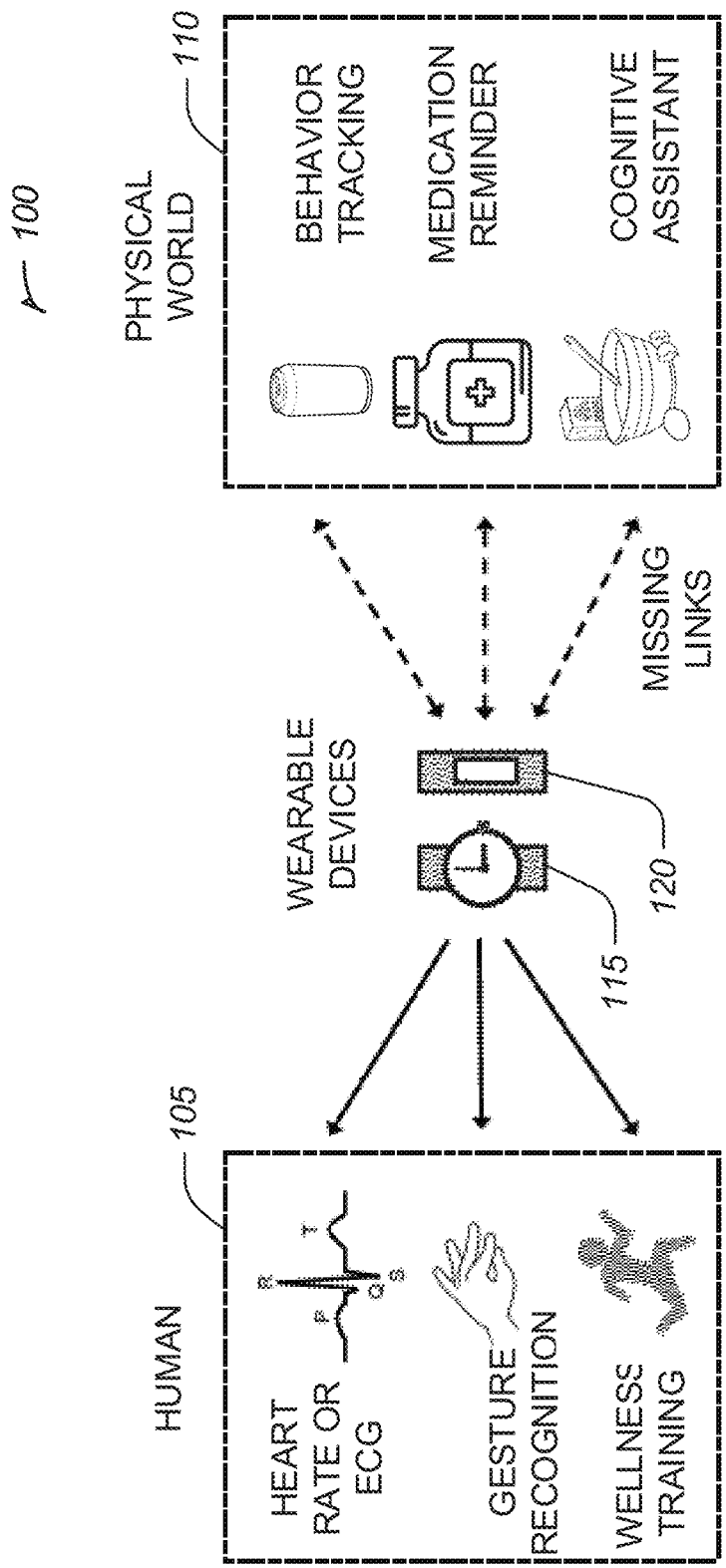
FIG. 1 illustrates types of interactions possible with personal electronic devices, according to various embodiments.

Often Internet of Things (IoT) devices monitor interactions between people and smart objects. The ability to monitor such interactions is important for a range of applications including home automation, health and wellness, augmented reality, and tele-rehabilitation. Such interactions with IoT devices or smart objects may potentially be enabled by tagging objects (e.g., with radio-frequency identification (RFID), near-field communication (NFC), or Bluetooth low energy (BLE) tags), or instrumenting the environment (e.g., with depth cameras or radars), these options are either high cost, complex to deploy, inaccurate, or burdensome. A possible solution is a low-power wearable backscatter reader embedded in a smartwatch that may be used to sense passive tags on objects near a user's hand. This solution may include a backscatter reader architecture involving largely passive components, form-factor optimizations (e.g., the reader fits on a smartwatch), and antenna optimizations to achieve adequate coverage. For example, the reader may be more power-efficient than state-of-art commercial readers, provide 3D coverage around the wrist despite body blockage, and may be used to reliably detect grasping, touching, and other hand-based interactions. The reader may enable a range of new and unexplored applications of wearables.

Two categories of object interaction detection approaches exist. The first category involves tagging an object using an RFID tag, NFC tag, quick response (QR) code, BLE beacon, or Ultra-Wideband (UWB) beacon, thereby enabling identification and/or tracking. The second category of methods relies on passive sensing without tagging the object. For example, a smartwatch may measure hand movements via inertial signals, as well as acoustic and electromagnetic signatures emitted by the object itself. Such passive sensing may also leverage infrastructure components such as depth cameras, micro-radars, smart light bulbs, and acoustic arrays.

Many of the current options are not universally applicable solutions. RFIDs may be low-cost for tagging objects but could have a high overhead for maintaining expensive and often dense deployments of RFID readers. NFC and QR codes require explicit user involvement. BLE or UWB beacons have a high cost per unit and may only be suited for tagging high-value items where cost and battery replacement overheads are acceptable. Tagging-free or passive sensing approaches lack information from the object itself, and instead need to leverage features inferred indirectly from signals bouncing off the object. These approaches end up with a complex inference problem, where they may need to tease apart one specific interaction signature from a sea of other confounding signals. Thus, the challenge is achieving reliable interaction monitoring using direct measures while keeping deployment cost low.

An RFID reader that operates within the form-factor and power constraints of a smartwatch may meet these challenges. RFID readers are generally high power and consume several watts. This is based on the need to read tags from several tens of feet away in highly cluttered environments. This results in a transmission power that has to be high enough to power tags tens of feet away, and the receiver has to be sensitive enough to decode the weak reflected signal from the tag. As a consequence, RFID readers generally transmit at 1 W transmit power (i.e. the maximum allowable) and use active carrier cancellation techniques to extract the weak backscattered signal.

Interactive RFID system may use an RFID tag to provide identification and information, but may also be used to sense the type of interaction by analyzing low-level channel parameters, such as phase and received signal strength indication (RSSI). The interactive RFID system may detect whether the interaction involves touching a tag, blocking a tag, or moving a tagged object, including relative orientation with respect to a tagged object. This may have many applications such as interactive smart homes, human-robot interaction, and battery-less user interfaces.

A key feature in a smartwatch-based RFID reader is that it only need to measure interactions within a few tens of centimeters, which provides significant leeway for power optimization. However, the feature may also create a challenge with the occlusion by the hand and body blockage negating some of the advantages of reduced range.

From an applications perspective, a wrist-worn reader is important for a host of current and emerging tactile computing and interaction-based scenarios. Many existing applications may be enhanced with a wrist-worn reader ranging from food journaling and diet tracking, cognitive assistants that keep track of the order of object interaction, and home automation approaches that use RFIDs as sliders, switches, and controllers. Many more applications may emerge due to the ability to optimize the RFID's simple circuit to make it bio-compatible, ingestible, inkjet printable, and manufacturable with green materials. Thus, everything from smart pills to smart clothing may be equipped with embedded RFIDs, making such a wrist-worn reader a crucial component of the wearable ecosystem.

The design of a wrist-worn reader raises three considerations: power consumption, radio frequency (RF) performance, and signal classification. A bottleneck in power consumption of conventional RFID readers is that the reader needs to power and communicate with tags that are tens of feet away. In contrast, the wrist-worn reader may only need a very short working range, such as 20-30 centimeters, to detect interaction with objects. Leveraging this gap, it may be possible to vastly reduce overall power consumption while still providing an in-phase and quadrature (IQ) signal to enable a range of detection and tracking applications. A wrist-worn reader may include additional sensors to sense signals emitted or induced from an object via vibration, electromagnetic, acoustic, or capacitive sensors.

A consequence of optimizing the backscatter reader for power is reduced receiver sensitivity, which may result in decreased RF range performance. Additionally, body effects and attenuation due to device form-factor around the wrist may attenuate the signal further. The signal strength and phase information measured from the backscattered signal may provide information about distance and orientation, which in turn may enable new sensing and interaction applications.

Many real-world applications exist where there is a need to monitor interaction between people and things. Wearable technologies may be primarily focused inward, such as measuring body signals, rather than outward, such as monitoring interaction with external objects. With many wearables, heart rate may be measured using electrocardiogram (EKG), gestures measured using inertial measurement units (IMU), and mobility measured using global positioning system (GPS), but it may not be possible to measure what objects a person touched or used.

FIG. 1 illustrates several types of interactions possible with wearable devices and a wrist-worn reader, according to some embodiments. In the illustration 100, wearable devices such as a smartwatch 115 or a fitness tracker 120 may monitor and collect data about the human/user the device is being worn by. Human examples 105 include monitoring the user's heart rate or ECG, utilizing inertial sensors to detect and monitor the gestures and motions of the user, or for wellness training such as collecting the number of steps taken or tracking the distance a user has travelled by running or walking. The wrist-worn reader may provide the ability for a device to detect objects in the physical world around the user and provide information to the user about those objects or track how the user interacts with the object and the physical world. Physical world examples 110 include behavior tracking such as monitor the items a user consumes or uses, medication tracking such as monitoring if the user has or has not taken pills, or cognitive assistance such as helping a user through instructions like a cooking recipe.

There are two classes of example applications where a wrist-worn reader may have significant utility. The first class involves monitoring of interaction with tagged objects without explicit user interaction (unlike NFC tags or QR codes which require user interaction, such as actively scanning the QR code). For example, automated consumption journaling may be possible using RFID tags on soda cans, alcoholic beverages, chips, and cigarette packs. The automated journaling may assist with behavior tracking and modification for alcoholics, smokers, and binge eaters. Such tracking may also be beneficial to monitor medication adherence. Persistent and consistent medication adherence is needed for optimal clinical outcomes.

Wrist-worn readers may also be useful as a cognitive assistant that tracks the sequence in which tagged objects are used. For example, the wrist-worn reader may track and provide instructions for furniture assembly, food preparation using a recipe, and daily routines for the elderly. For example, the wrist-worn reader may be used when assembling furniture and determine the user is working with furniture piece A during step 2 of the assembly, when the proper piece is furniture piece B. A cognitive assistant may be useful at the workplace. For example, the wrist-worn reader may track the sequence of objects a physician might want to interact with during a medical procedure. A wrist-worn reader may also be useful with ingestible pill tracking (e.g. ultra-high frequency (UHF) RFIDs have recently been embedded in smart pills), as well as smart clothing and garments.

The second class of example applications where a wrist-worn reader may be useful involves enabling new interaction methods with the physical world. For example, by detecting touch interactions with an RFID tag, a low cost "stick-on" switch may be used for home automation (e.g., garage controller or light switch), or home security (e.g., unlocking door knobs). This model may extend to RFID-based sliders and richer wire-free models of interactions.

A common method to track physical objects is to attach tags to the object. A wide array of tagging methods are available, examples including RFID, NFC, QR codes, BLE, and UWB. However, none of these are a panacea for pervasive sensing of interaction between people and things. NFC tags and QR codes have a very low cost and a limited range, but need explicit user involvement since the ranges are too short for automatic monitoring. RFIDs (with a tethered reader) also have a very low cost with a medium range and no user burden, but require significant reader infrastructure. BLE and UWB beacon tags are more expensive with a medium range but have a maintenance overhead for replacing batteries.

Among research-grade tagging methods, ambient backscatter tags that leverage Wi-Fi, frequency modulation (FM), or Bluetooth signals may be utilized. However, there is a distinction between re-using an ambient carrier for communication versus using them for powering the tags. Ambient backscatter tags still need a proximate carrier generator to provide power. Because the circuitry is typically more complex for ambient backscatter compared to simple on-off keying tags, the power needs may be higher than conventional RFIDs (most ambient backscatter techniques report 20-50 µW power draw whereas passive RFIDs consume 2-10 µW). A wrist-worn reader may power proximate tags and be a carrier for communication. This greatly increases overall power consumption.

A significant challenge in passive sensing approaches (whether using a smartwatch or infrastructure) is accuracy in real-world settings. The dynamics of real-world settings often make it difficult to isolate a specific sensor signature from a plethora of other similar looking signals. The systems and techniques described herein for a wrist-worn reader provide a direct and unambiguous signal about the interaction, which helps precisely localize temporal windows when an interaction occurs. It may be possible to further improve the ability to characterize interaction with objects by combining methods.

A key consideration in the design of a wrist-worn reader is the power consumed by the carrier transmitter and the signal receiver subsystem. The power consumption is higher than typical low-power active radios like Bluetooth for two reasons. First, the backscatter reader provides power and RF carrier to the tag while also decoding the tags response, so it needs to transmit the carrier wave and run the reception circuit at the same time. This is unlike active radios where the carrier is generated by the transmitter and the reception circuit is at the receiver.

Second, the transmitted carrier creates self-interference because some of the carrier signal leaks into the receiver. This results in increased hardware complexity and more power consumption to cancel self-interference. The increased power consumption may not be an issue for a tethered RFID Reader, but it is crucial for wearables that run on a small battery.

The key implication is that consideration is needed for both the carrier transmitter and receiver power draw. In one scenario, if a reader transmits at too low an output power level, then the receiver design may become more complex and power-hungry to decode a very weak backscattered signal. In another scenario, if the design of the receiver is minimalist and low-powered but also loses too much sensitivity in the process, then the carrier transmit power level needs to be increased thereby sacrificing efficiency.

The second key design consideration is the signal attenuation due to a combination of high path loss and body attenuation. First, considering path loss. Assuming the channel loss follows a free-space model, the received signal $P_r$ at the reader side may be calculated as:

$$P_r = \frac{P_t G_t G_r G_l^2 \lambda^2 \Delta_\sigma}{(4\pi)^3 d^4}$$

Where $P_t$ is the transmit power, $G_t$, $G_r$ and $G_l$ are the antenna gain of transmitter/receiver at reader side and antenna gain of tag. $\lambda$ is the wavelength of carrier, and d is the distance between reader and tag (assuming transmit and receive antenna on the reader side are co-located). $\Delta\sigma$ is differential radar cross section determined by the impedance of antenna and load. The differential radar cross section may be calculated by:

$$\Delta_\sigma = \frac{|\rho_1 - \rho_2|^2}{4}$$

$$\rho = \frac{Z_l - Z_a^*}{Z_l + Z_a}$$

Where $\rho$ is complex power wave reflection coefficients, $Z_l$ is the impedance of load, and $Z_a$ is impedance of antenna.

From the first equation, the received signal strength is $P_r$ $\alpha 1/d^d$, which drops very quickly as the separation between the reader and tag grows.

This signal is further attenuated by the effect of the hand. While it is difficult to analytically characterize the precise effect of the hand on the signal, prior studies on signal attenuation for mobile phones have shown that antenna impedance may change significantly when the device is held on the hand. The antenna detunes in the presence of the human body, which changes its impedance and degrades performance.

Finally, the path loss and body blockage effects are compounded by the fact that a backscatter receiver also has to deal with noise due to self-interference, hence its sensitivity is not as high as typical active radios like Bluetooth and Wi-Fi. For example, commercial RFID readers report a sensitivity of only −80 dBm whereas commercial Wi-Fi receivers have a sensitivity of −95 dBm.

From an architecture perspective, the primary source of optimization is the reduced working range of the wrist-worn reader. Unlike tethered readers that need to power and read tags tens of feet away, the desired working range of a wrist-worn reader may be less than 10 feet. For example, a preferred range may be 20-30 cm in order to power and read tags on objects near the hand. Longer working ranges may not provide the precision needed for a wrist-worn reader since the wrist-worn reader would detect many objects in the vicinity of the hand rather than just the object being held in the hand. For example, a cabinet may have many tagged medication bottles which might all be read by a reader that has a working range of a meter or more. But with a shorter working range, an individual bottle may be isolated as it is being opened.

The reduced range has two implications from a power perspective. First, the transmit power level may be reduced to achieve the target working range. Second, the receiver may be designed to be less sensitive and therefore lower power. Being less sensitive and lower powered is important because the backscatter reader's receiver is complex and often involves power-hungry active self-interference cancellation techniques to deal with leakage from the carrier emitter. As a consequence, a typical commercial RFID reader with IQ output consumes more than 640 mW, potentially up to 2 Watts. This is undesirable for a wearable smartwatch with roughly a 200 mAh Li-ion battery.

Figure 2:
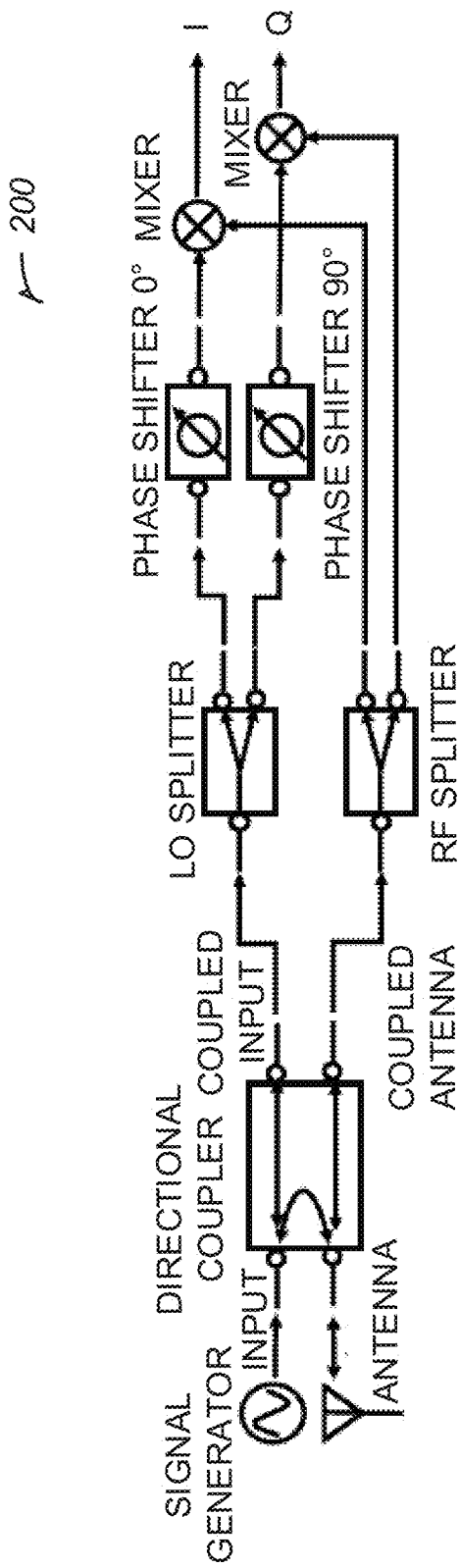
FIG. 2 illustrates an example of a low power receiver pipeline, according to some embodiments.

FIG. 2 illustrates an example of a low power receiver pipeline that may be utilized for a wrist-worn reader, according to some embodiments. The system and techniques described herein for a wrist-worn reader may use a low-power design that may be constructed from passive components. The example design 200 for a low power receiver pipeline may include a directional coupler, splitters, delay components and mixers, all of which are passive components and consume zero power. The I and Q signals are fed into a baseband amplifier that does consume power, but typically a few hundreds of micro-watts. The carrier emitter may be shared with the transmitter circuitry, and therefore does not add additional cost to the receiver. The receiver is considerably more power-efficient than state-of-art reader receivers, and considerably reduces power consumption while providing adequate receive sensitivity.

The wrist-worn reader may use circuit-level modules, for example directional couplers such as the type commonly found in single-antenna RFID readers, passive delay components such as those used in RF cancelers, and passive mixers such as those common in RF circuits. The wrist-worn reader may include these modules to achieve a practical zero-power receiver for a wrist-worn solution. Because power is generally not as severe a bottleneck for RFID readers, there previously has been limited exploration of low-power architectural designs.

A goal of the wrist-worn reader design is to remove leakage between the transmitter and receiver while still sharing a single antenna to minimize the form-factor. As an example, this may be achieved by a passive microwave component such as a directional coupler, that directs RF signal in a particular direction and isolates the couple ports by about 10-20 dB to remove a significant fraction of leakage between the transmitted carrier and the received signal.

Figure 3A:
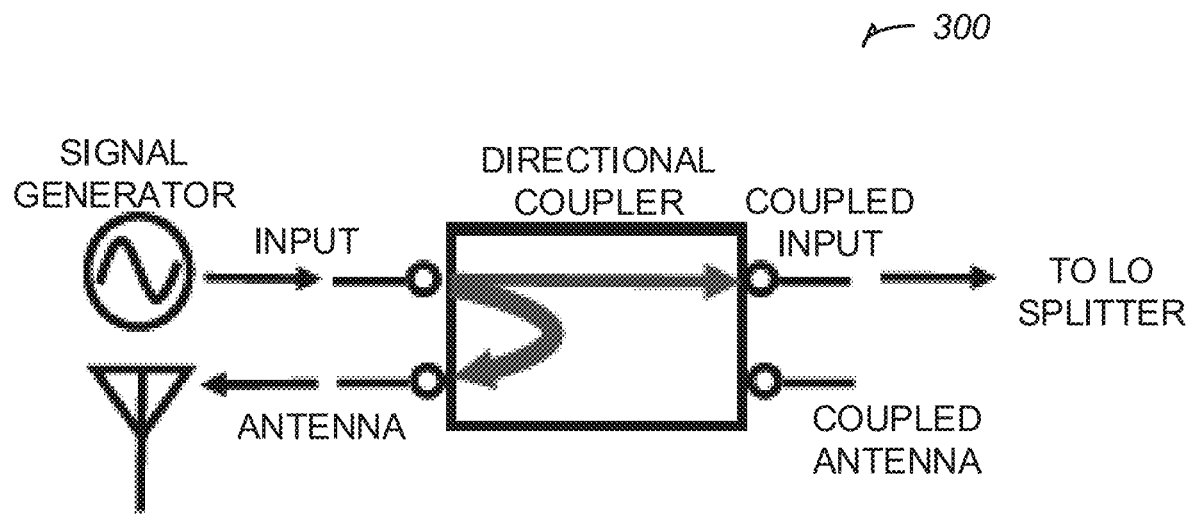
FIGS. 3A and 3B illustrate an example of how a directional coupler works while still allowing sharing of the oscillator and antenna, according to some embodiments.
Figure 3B:
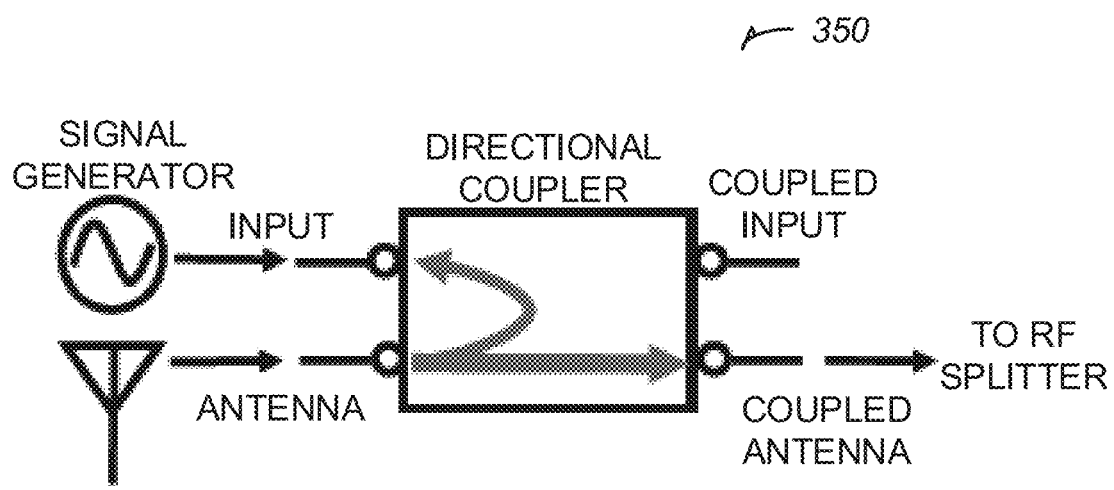

FIGS. 3A and 3B illustrates an example of how a directional coupler works while still allowing sharing of the oscillator and antenna, according to some embodiments. Coupler 300 is a signal source to antenna example of what may occur during transmission. For example, most of the signal is transmitted out through the antenna but a portion of the signal (such as between −10 dB or −20 dB weaker) goes into the coupled input, which may then be served as the local oscillator signal for the mixer in the receiver. Coupler 350 is an antenna to receiver example of what may occur during reception such as most of the received signal may be coupled to the "coupled antenna" port as input of the mixer, and the small amount of signal that leaks into the "input" port does not affect the operation of the signal generator.

Another goal for the design of the wrist-worn reader is to obtain the in-phase and quadrature outputs from the coupled signal in a passive manner. The in-phase and quadrature outputs are used to improve decoding efficiency and particularly to detect the phase of the incoming signal. The ability to detect signal phase has been shown to be valuable for many RF-based classification methods and specifically those designed with RFID tags.

An example of how to obtain the in-phase and quadrature output may be described in several steps. The first step is to split the coupled signal into two ways for the in-phase and quadrature mixer input. The quadrature channel local oscillator (LO) is phase shifted by 90 degrees before being fed into the mixer. A delay line may be used as a passive phase shifter to avoid the use of active components. The coupled antenna signal is fed into the mixer after being split in two ways, as shown in FIG. 2. This process allows the reader to receive the in-phase and quadrature signal output of the backscattered signal.

After the optimizations to reduce power, another consideration for a wrist-worn reader is the form-factor, such as a smartwatch, fitness tracker, or similar device that may be worn on the wrist or similar unobtrusive body placement. For the wrist-worn reader to function and be a worn device, two factors are considered: the antenna placement and the form factor.

The first consideration is the placement of the antenna in a device such as a smartwatch. As an example, the size for a $\lambda/4$ antenna at 915 MHz is about 8 cm, which is larger than the dimension of a typical watch. A possible solution is the use of a ceramic chip antenna, which may be designed to be a few millimeters in size. The size of a chip antenna is much smaller than traditional whip antenna because ceramic has a much higher dielectric when compared with air, therefore the effective wavelength of a radio wave is shorter in a ceramic dielectric than in air, and the antenna may be fabricated as a compact helix making it space-efficient. However, a problem that may occur with a small ceramic antenna, is that the antenna may be placed on the top of the wrist, whereas the interesting activity during interaction may occur more frequently on the palm side. In other words, antenna placement on the watch has the maximum attenuation due to body blockage since the signal has to pass through the hand both in the forward and reverse directions. This is a significant issue given the backscatter link limitations, which is much lower than an active radio.

An example embodiment for antenna placement may be to embed a larger flexible dipole antenna into the wristband rather than placing a small ceramic antenna inside the watch. There may be two advantages to this approach. First, the longer form-factor may make it less susceptible to body blockage because at least some of the signal may propagate through gaps in the hand. Second, the wristband is long enough to embed a dipole rather than monopole antenna, allowing for the achievement of an additional 3 dB gain.

The other practical consideration is form factor. Most of the components shown in FIG. 2—such as the directional coupler, splitter and mixer—are small form-factor components, but the phase shifter does not have a similar form-factor. A passive phase shift may be accomplished using a delay line. At 915 MHz, the required time delay to achieve 90° phase shift is 273 picoseconds. However, commercial delay lines that satisfy this requirement typically have high insertion loss and high delay tolerance (+/−50ps). The insertion loss may further attenuate the signal, and the delay tolerance may add an offset to the IQ signal, which makes it deviate from being perfectly orthogonal.

Given these issues, another embodiment may be to build the printed circuit board (PCB) trace as a delay line. If the PCB trace is impedance controlled, the required length to achieve time delay $\tau$ is $L=\tau c/\sqrt{\in r}$, where c is speed of light, and $\in r$ is the dielectric constant of the PCB material. For example, for FR-4 material, $\in r$ is approximately 4.2. Given these parameters, the length to achieve 90° phase shift at 915 MHz is 40 mm, which fits barely into a typical watch with 42 mm width. This may still be too large since the entire space may not be spent on a delay line. To further reduce the length requirement for delay line, a technology called serpentine routing may be used. With this technique, it may greatly reduce the PCB length required for the delay line.

A possible implementation of a wrist-worn reader uses the receiver and antenna optimizations described previously. The PCB mainly consists of three modules: the carrier emitter module, the optimized passive receiver module, and the main controller module. An example design for the system is in a modular manner to support fast iteration and isolate errors.

The first module is the carrier transmitter or emitter module, such as an AX5043 low power transceiver. A transceiver such as an AX5043 is both low power and may be set to generate a constant frequency carrier. The module is connected to the Backscatter reader module. For example, the PCB is a four layer PCB build with FR4 material.

The second module, the optimized passive receiver module, is a low power IQ Backscatter receiver/reader. The IQ Backscatter receiver/reader may be constructed as a four layer PCB built with FR4 material, with the impedance of the delay line and RF traces are carefully impedance controlled to ensure proper operation.

The third module, the main controller module, incorporates the control logic and user interface. The third module is a main controller module such as an STM32 microcontroller operating with a low power memory liquid crystal display (LCD), Bluetooth transceiver and a six axis IMU.

The wrist-worn reader may be constructed with four main components: a carrier generator, a backscatter reader, a controller board, and an antenna. The placement of the antenna may affect how well the wrist-worn reader may receive a signal. The antenna may be integrated into strap of a wrist-worn device, but the positioning of the antenna in the strap may produce different results for reception of a signal. For example, the antenna may be positioned under the wrist, aligned on the same side of the wrist as the thumb, or aligned on the same side of the wrist as the pinky finger.

Figure 4:
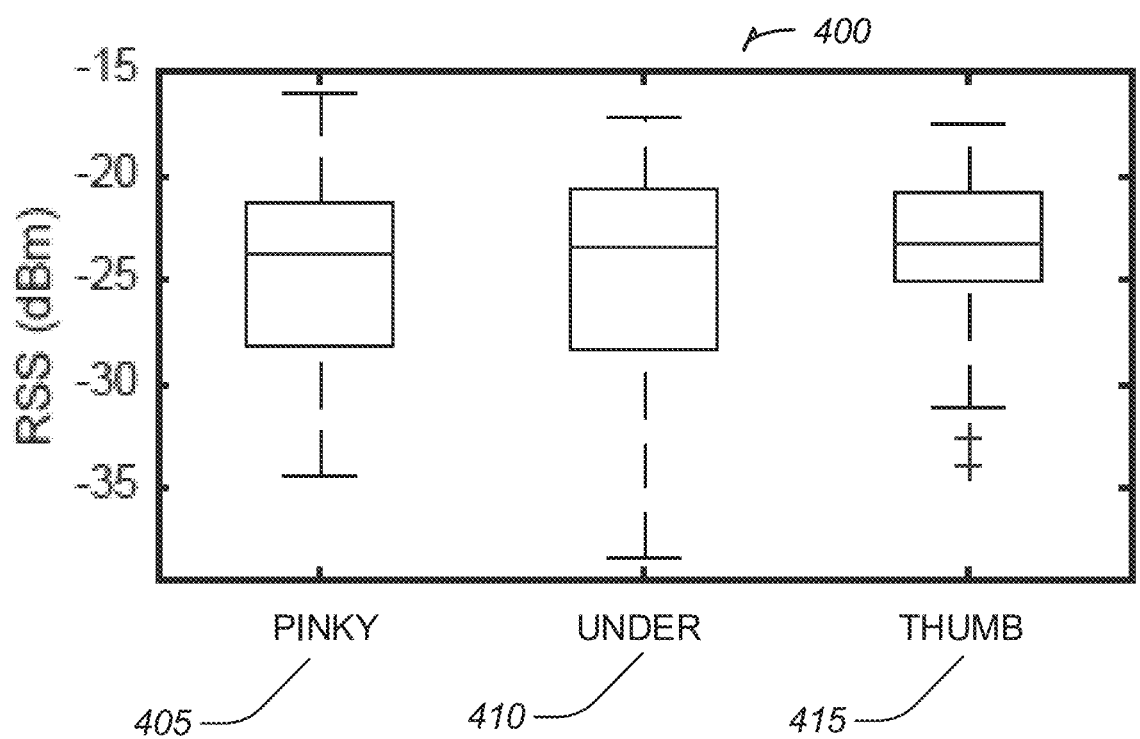
FIG. 4 is a box plot representing the received signal strength for the different antenna positions.

FIG. 4 is a box plot representing the received signal strength for the different antenna positions such as under the wrist, the thumb side, and the pinky side. The testing results 400 suggest that the different positions (pinky side 405, under the wrist 410, and thumb side 415) are roughly equivalent in median performance, but the variance is lower when the antenna is placed on the thumb side 415. The thumb side 415 may show lower variance as is the antenna placement that is least blocked by the hand or fingers.

The antenna may also be is a straight configuration or a curved configuration, depending on the type of device the wrist-worn reader and its antenna is integrated in. For example, if the wrist-worn reader is part of a smartwatch, the antenna may be placed in the strap of the smartwatch, thus resulting in a curved configuration for the antenna.

Figure 5:
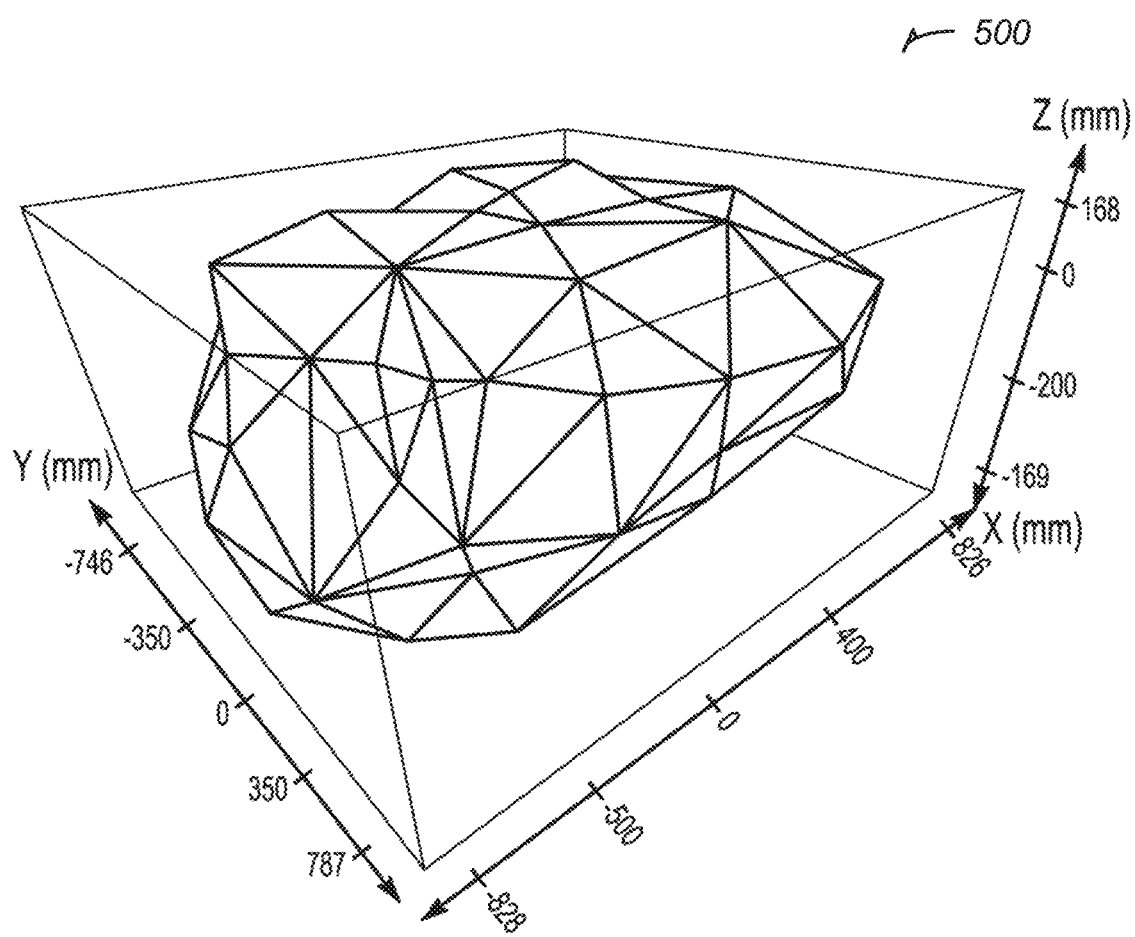
FIG. 5 and FIG. 6 are two coverage graphs demonstrating the three-dimensional coverage of the wrist-worn reader, according to various embodiments.
Figure 6:
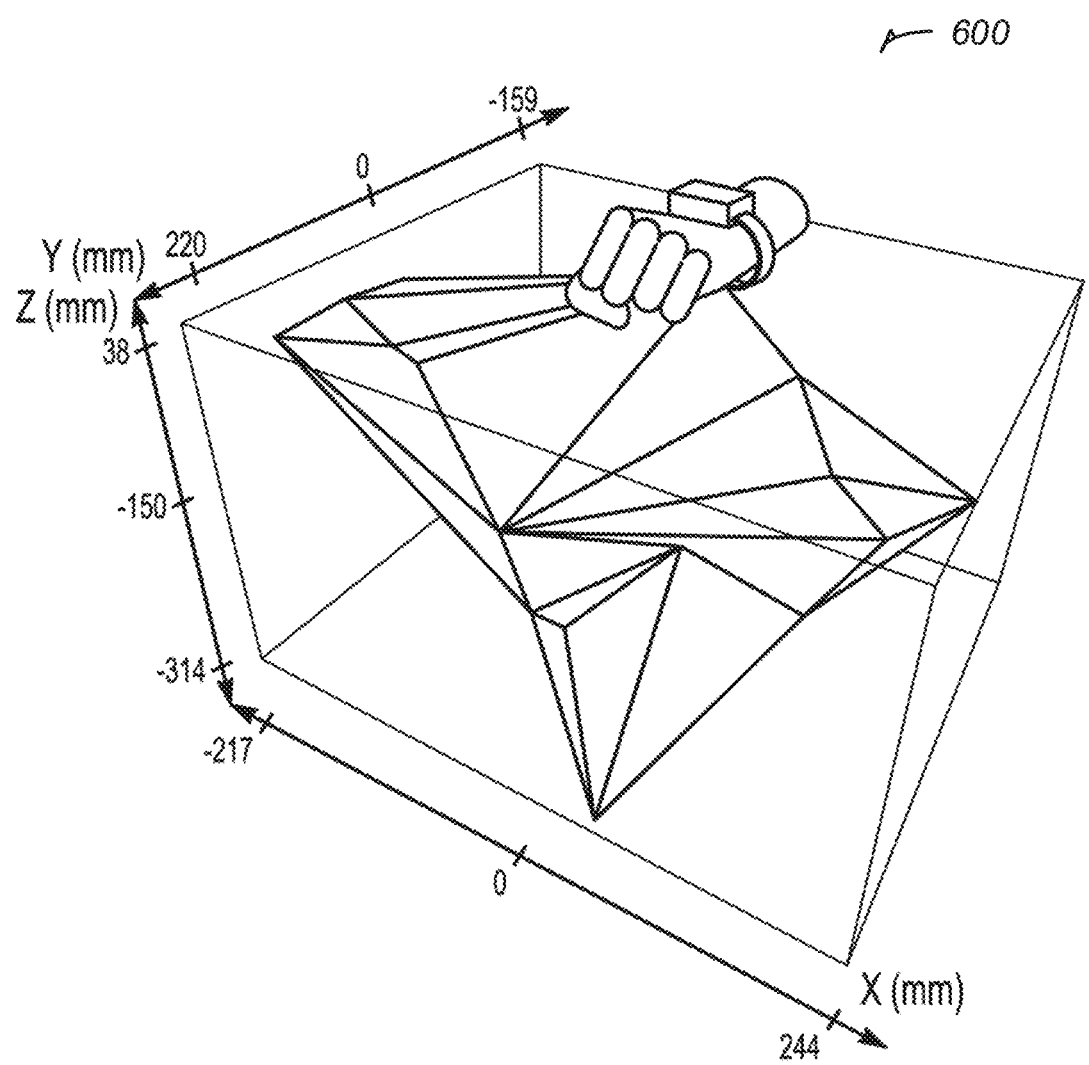

FIG. 5 and FIG. 6 are two coverage graphs demonstrating the three-dimensional coverage of the wrist-worn reader when the reader is not attached to the wrist 500 and when the reader is attached to a wrist 600. The graphs demonstrate that while the coverage area is reduced because of the presence of the wrist and hand, the wrist-worn reader has sufficient coverage. Graph 500 is a representation of three-dimensional coverage of the wrist-worn reader without the hand. Graph 600 is a representation of three-dimensional of the wrist-worn reader with the hand. The origin point 605 is the top of the smartwatch. When the hand is not present, the coverage is roughly 75-80 cm along each direction along the horizontal dimension and a bit lower in the vertical direction. When the wrist-worn reader is worn with the antenna under the wrist, the signal is not strong enough for harvesting above the wrist, but there is roughly 30 cm range below the wrist and 22 cm range in front of the hand, which is the intended range for short-range sensing of interactions.

The system and techniques described herein for a wrist-worn reader has two advantages over infrastructure mounted RFID readers. First, the wrist-worn reader operates in a mobile setting, unlike tethered readers. Second, the wrist-worn reader is only impacted by RF signal variation in a small area around the wrist rather than due to cluttered real-world environments.

The use of the IQ output of the wrist-worn reader may provide instantaneous and relative phase information, as well as signal strength, from which features may be derived. Three categories of features may be derived, including phase-based features, signal strength-based features, and temporal features. The wrist-worn reader may be implemented using instantaneous phase, absolute phase, or relative phase for classifying the wrist-worn reader user's actions. Signal strength-based features, such as the Received Signal Strength (RSS) may be noisy when a tag and reader are far apart, but for the wrist-worn reader where the tag and reader are within close proximity, RSS is well suited and contains reliable information regarding nearby tags. The signal-to-noise ratio (SNR) (difference between RSS and noise floor) may be used to determine the presence or absence of tags. Temporal features utilize the time-series of phase and RSS. When the reader is approaching a tag, changes in phase and RSS may be used to differentiate between user activities such as catching a ball, grabbing a pen, or picking up a cup. When a reader is moving away from a tag, changes in phase and RSS may be used to differentiate between placing, dropping, or throwing an object. The temporal features may also determine how long a tag remains in the vicinity of the reader, thus indicating how long a tagged object is being held in the user's hand. It may also determine when a tagged object was grabbed or dropped, which may also provide phase and RSS variation data for while the object was held. This data may be used to determine user actions such as pressing a key, drinking, or passing a tag.

Utilizing these features, the wrist-worn reader may determine when a user of the reader is grabbing, holding, touching, or passing a tag or object with a tag. For example, a tagged item may be a soda can and the determined interaction is a user grabbing and releasing the can. Another example may be a tag placed on a wall that is touched or tapped (such as interacting with a light switch). Another example may be tag on an object that the user passes their hand by to generate an interaction.

The information the wrist-worn reader receives from the tag may also be used to determine the action being performed by the user. For example, the wrist-worn reader may not be able to determine if the user had quickly picked up and released an object or simply passed by the object with their hand and wrist-worn reader. Information from the tag may indicate that the tag is attached to the wall and used as a light switch. Based on this information, the reader may then determine that it would be impossible for the user to have picked up the object the tag is attached to, as it is attached to a wall, and thus the action performed by the user was a pass with the hand.

A wrist-worn reader may have applications for helping the disabled. For example, a blind person may wear a smartwatch with the wrist-worn reader technology. When given a choice of things that may be difficult to differentiate, such as a group of various flavors of soda, all in similar cans, the person could speak the flavor of soda they desire into the smartwatch. The person would then pick up cans until the wrist-worn reader determines the can they are holding matches the flavor the person desired. When the correct flavor is acquired, the wrist-worn reader may provide an audio or haptic cue to the person that they have found the correct flavor. The wrist-worn reader could be used by someone that is blind or of poor eyesight as a way to "see" the details. When attempting to find a public restroom or locate an office number, instead of having to search for the braille marking with their hand, the user may hold the wrist-worn reader near the door and the wrist-worn reader could read the embedded tag on the door and then speak the information to the user, such as "men's room". Because of the short range used by the wrist-worn reader, the user would have little doubt they were located at the door indicated by the wrist-worn reader.

The wrist-worn reader, with the ability to determine when an object is being grasped or held, may also have applications in sports, such as determining when a baseball has been caught by a player. Such a determination would confirm if the player had successfully caught the ball before the runner reached the base. The wrist-worn reader may also have application for guiding a user through instructions. A user may wish to build something with various tools, including multiple types and sizes of screwdrivers. A user may use an instruction video on their smartphone which is connected to their wrist-worn reader. At each step, the wrist-worn reader may confirm the user is using the correct tool for the step and send the user a signal if it is not correct.

A tag and the wrist-worn reader may also be used as a switch, such as a light switch. For example, an RFID tag may be stuck to the wall. The wrist-worn reader receives the signal from the tag and uses an accelerometer to detect when the finger touches the tag. When this happens, the accelerometer shows a sudden stop of the finger, and the signal changes suddenly due to coupling with the body. The touch event is localized in the accelerometer signal since there is a sudden change in acceleration at the point of contact between the finger and the wall (similar to how step counters may detect the point of contact between the foot and the floor). When the touch event is detected, the touch interaction is mapped to a home automation scenario like closing the garage door or turning on lights. Thus, a battery-less or non-powered switch exists that has a similar tactile experience as a regular electrical switch, but needs no wires. While one could do the same task by having an app on a smartphone or smartwatch that controls the lights or other electronic device, the main advantage of using the wall tag that humans are used to tactile control in homes and does not require taking the time to open the switch control app in a smartphone or smartwatch. The user is able to flip a switch for the lights (or other controlled electronic device) as soon as they walk in the room with no more effort than touching a spot on the wall.

This type of application of the wrist-worn reader where it is determined a user of the wrist-worn reader either taps or swipes a tag may be utilized in many situations where a button or switch is used to activate or control a device. Applications may include opening a door, turning on a car, taking a picture, dispensing an item (such as beverages from a fountain or gasoline for a car), or reordering an item from an online retailer.

A tag and the wrist-worn reader may also be used as a slider control in the home (or office, etc.). A slider switch may be used for adjusting the lighting level in a room or controlling the volume on a television or stereo. An RFID tag may be attached to a wall or a side table next to a sofa or chair. For example, the wrist-worn reader may detect when the tag is touched. An accelerometer in the wrist-worn reader may determine when the finger slides on the tag. Using the motion of the accelerometer and the phase information from the wrist-worn reader technology to detect how far a finger has moved on the slider. The amount of movement may then be transmitted to the corresponding device (e.g., the lights, the television).

Figure 7:
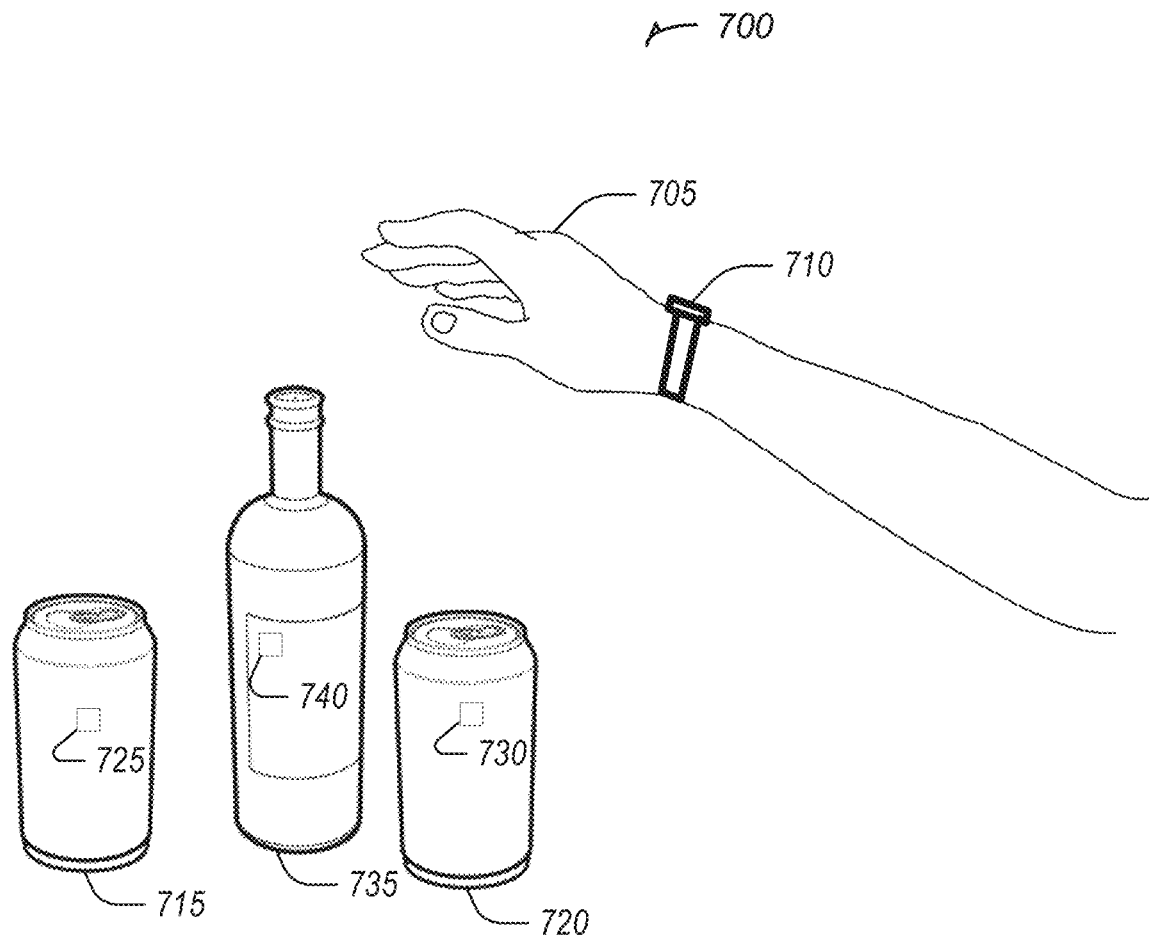
FIG. 7 illustrates a wrist-worn reader in a real world environment, according to various embodiments.

FIG. 7 illustrates a wrist-worn reader in a real world environment, in accordance with some embodiments. For example, in the environment 700, when the hand 705 of a user of the wrist-worn reader 710 approaches objects which have been tagged, the wrist-worn reader may relay information about the objects to the user. If the user could not discern the difference between the first can 715 and the second can 720, the wrist-worn reader 710 may read first tag 725 and second tag 730 and convey information about the first can 715 and second can 720 to the user, such as providing audio feedback of the flavor or nutritional information. The wrist-worn reader may also track what a user consumes. The wrist-worn reader 710 detects wine bottle 735 from the wine bottle tag 740. With data collected from an accelerometer, the wrist-worn reader may determine the user has grasped and picked up a wine bottle 735 and thus tracks the user has consumed wine.

Figure 8:
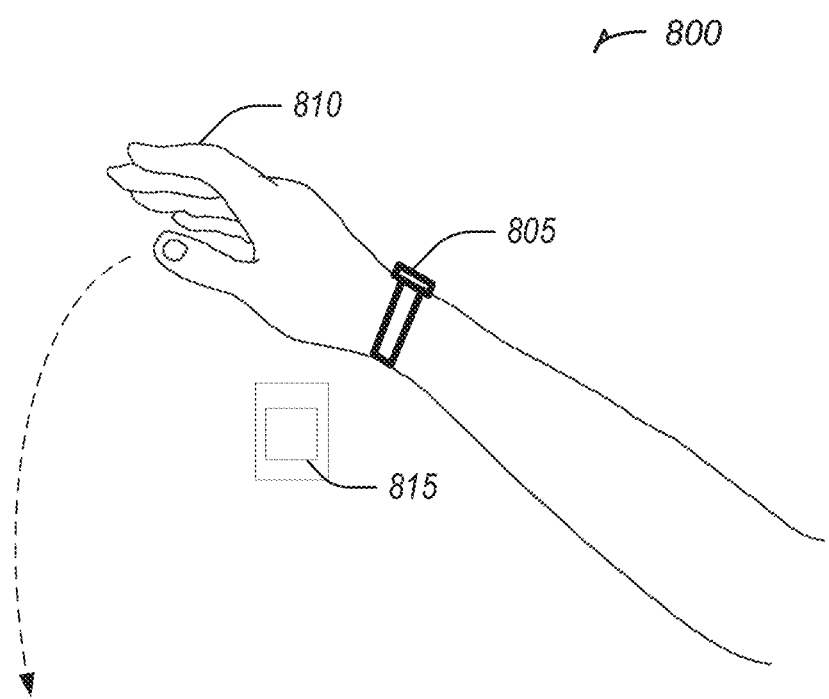
FIG. 8 illustrate a wrist-worn reader and a tag on a wall, in accordance with some embodiments.

FIG. 8 illustrates a wrist-worn reader and a tag on a wall, in accordance with some embodiments. A wrist-worn reader may be used to read tags attached to walls for purposes of security and activating devices. For example, in the environment 800 a user wearing a wrist-worn reader 805 may pass their hand 810 by a tag 815 located on a wall. The tag 815 may be utilized in a fashion similar to a light switch. When the user's hand 810 and the wrist-worn reader 805 pass by the tag 815, the reader detects the tag 815 and reads the information provided by tag 815. To detect precisely the instant of touching or passing the tag 815, the phase and RSSI information from the tag may be combined, and together with information from an accelerometer in the wrist-worn reader. The tag 815 may provide the information that is used to turn on the lights. The wrist-worn reader 805 may then transmit, such as with a Wi-Fi transmission, a signal to the lights in the room to turn on. In addition, the user may program settings for how they prefer the lights in the room (e.g., the brightness level, the number of lights to turn on), thus, in addition to transmitting a signal to turn the lights on, the wrist-worn reader may also include information about the user's lighting preference. The tag 815 may then be used as a singular switch for the lights, but each wrist-worn reader user that enters the room and swipes by the tag 815 may have the lights turn on automatically to their preference based on the information stored and transmitted by their wrist-worn reader. An additional use of the touch sensor using RFIDs may be to use it as a +/− slider. Once the tag 815 is touched, the user's hand, with the wrist-worn reader, may move to the left or right to adjust incrementally, such as a volume controller or the brightness of the lights.

Figure 9:
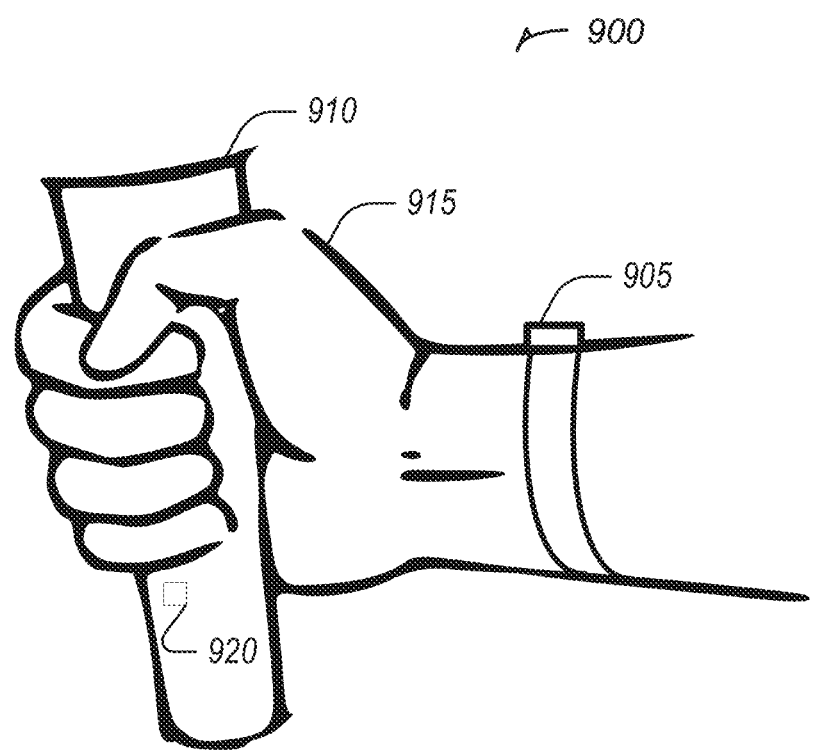
FIG. 9 illustrates a usage of the wrist-worn reader, according to various embodiments.

FIG. 9 illustrates a usage of the wrist-worn reader, according to various embodiments. The wrist-worn reader may read a tag attached to an object in the range of the reader. In addition, based on the time the tag is within the range of the reader and the classification of the phase and signal strength, the wrist-worn reader may determine the object is being held by the user. For example, in environment 900, a user wearing a wrist-worn reader 905, grasps an object 910 with their hand 915. The wrist-worn reader may read the tag 920 attached to object 910. The wrist-worn reader 905 may then track the time the tag 920 is within range. The wrist-worn reader 905 may also classify the phase and signal strength data from the tag 920. Based on the time and classified data, the wrist-worn reader 905 may determine if the object was within range, but never picked up, picked up and set back down, or held for an extended period of time. This type of interaction classification may be utilized in various ways, such as monitoring for alcohol consumption. As an example, the classification by the reader may determine if the user had taken just a couple of sips of a beverage, or had consumed the whole beverage or multiple beverages.

The wrist-worn reader may combine detection of RFID tags and RFID signals with an IMU or accelerometer. Using both RFID signals and IMU sensor may provide complementary information where the low-level RF signal provides relative distance/orientation information to a tagged object whereas the IMU provides more fine-grained information about the movement of the wrist while the tagged object is in the hand. This may be useful in combination, for example, in the area of recognition of activities like smoking, eating, drinking, pill ingestion, and other actions via inertial signals. A major challenge with recognizing these activities is dealing with confounders as many gestures may appear similar to each other. The wrist-worn reader with inertial sensors may provide more accurate detection via a two-layer processing engine. For example, the RF signals from the wrist-worn reader may be used to detect interactions with a cigarette pack, and the gestures can help detect the hand-to-mouth gestures corresponding to smoking.

Figure 10:
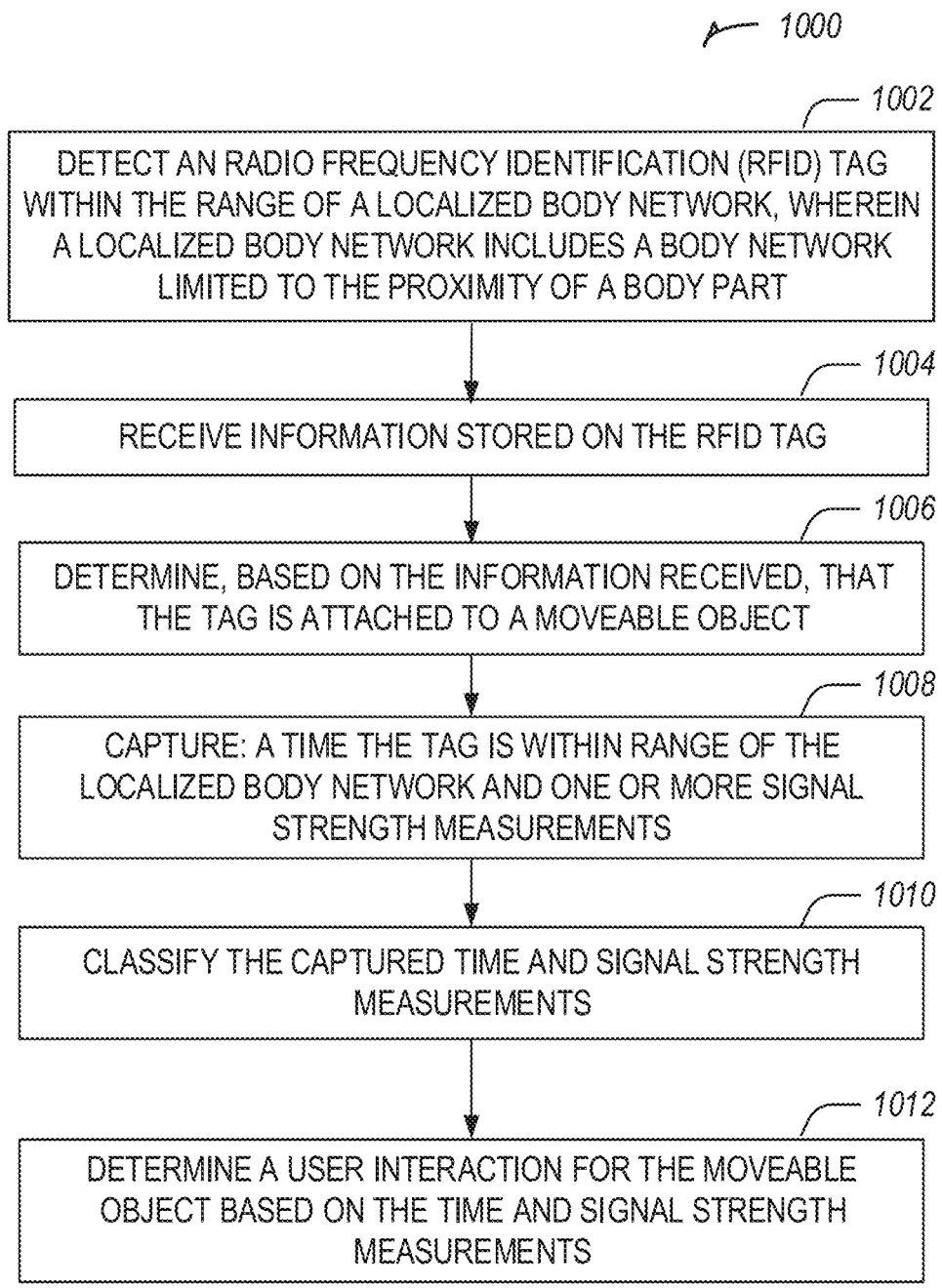
FIG. 10 illustrates a flowchart showing a technique for determining a user interaction with an object using a wrist-worn reader, in accordance with some embodiments.

FIG. 10 illustrates a flowchart showing a technique 1000 for determining a user interaction with an object using a wrist-worn reader, in accordance with some embodiments. The technique 1000 includes an operation 1002 to detect a radio frequency identification (RFID) tag within the range of a localized body network, wherein a localized body network includes a body network limited to the proximity of a body part. For example, the body part may be a hand or arm of a user. The localized body network may be limited to detecting RFID tags near the body part, such that if the localized body part is the right hand of the user, then an RFID tag near the user's feet or left hand would not be detected.

The technique 1000 may further include an operation 1004 to receive information stored on the RFID tag. The RFID tag may include information which identifies the object and characteristics of the object. For example, the RFID tag may identify that an object is a bottle of medicine and that the medicine it contains is amoxicillin. The RFID tag may be stationary and include information to identify a location, such as a room or a section of a store. The RFID tag may be stationary used to control a connected device, such as lights in a room or an audio system. The RFID tag may include information describing the device it is used to control and information for the wrist-worn reader to connect to the connected device and transmit commands.

The technique 1000 may further include an operation 1006 to determine, based on the information received, that the tag is attached to a moveable object. The information provided by the RFID tag may identify the object as a beverage or bottle of medicine, indicating it is moveable.

The technique 1000 may further include an operation 1008 to capture a time the tag is within range of the localized body network and one or more signal strength measurements. The time may be captured to determine the duration the object is within the range of the localized body network, and thus indicating how long the object was held or used. The signal strength measurements may be used to determine the movement of the object while within the range of the localized body network.

The technique 1000 may further include an operation 1010 to classify the captured time and signal strength measurements. The time, or duration the object is within the range of the localized body network and the signal strength measurements may be classified into different types of movement, such as drinking from a beverage can, taking a pill, or smoking a cigarette. Classifying the captured information may be accomplished by collecting data over time and using a machine learning technique to identify the measurement information as being associated with a particular action.

The operation 1010 may further include capturing information from a sensor, such as an accelerometer or GPS. The data from the sensor, the time duration, the signal strength measurements, and the information from the RFID tag may be used alone or in any combination to determine the interaction of the user with the RFID tag and the attached object. For example, an RFID tag may be placed on a wall for controlling a set of lights. The lights may be turned on and off, but also have the brightness adjusted. The RFID tag may provide information for the wrist-worn reader to communicate with the lights for controlling the lights. The sensor, such as an accelerometer, may determine the direction the hand of the user was waved, such as up or down. Based on the direction of the hand wave, the wrist-worn reader may communicate with the lights to adjust the more or less brightness of the lights.

The technique 1000 may further include an operation 1012 to determine a user interaction for the moveable object based on the time and signal strength measurements. The distinctions of the time and signal strength measurements may be classified into different types of movements, actions, and interactions.

Figure 11:
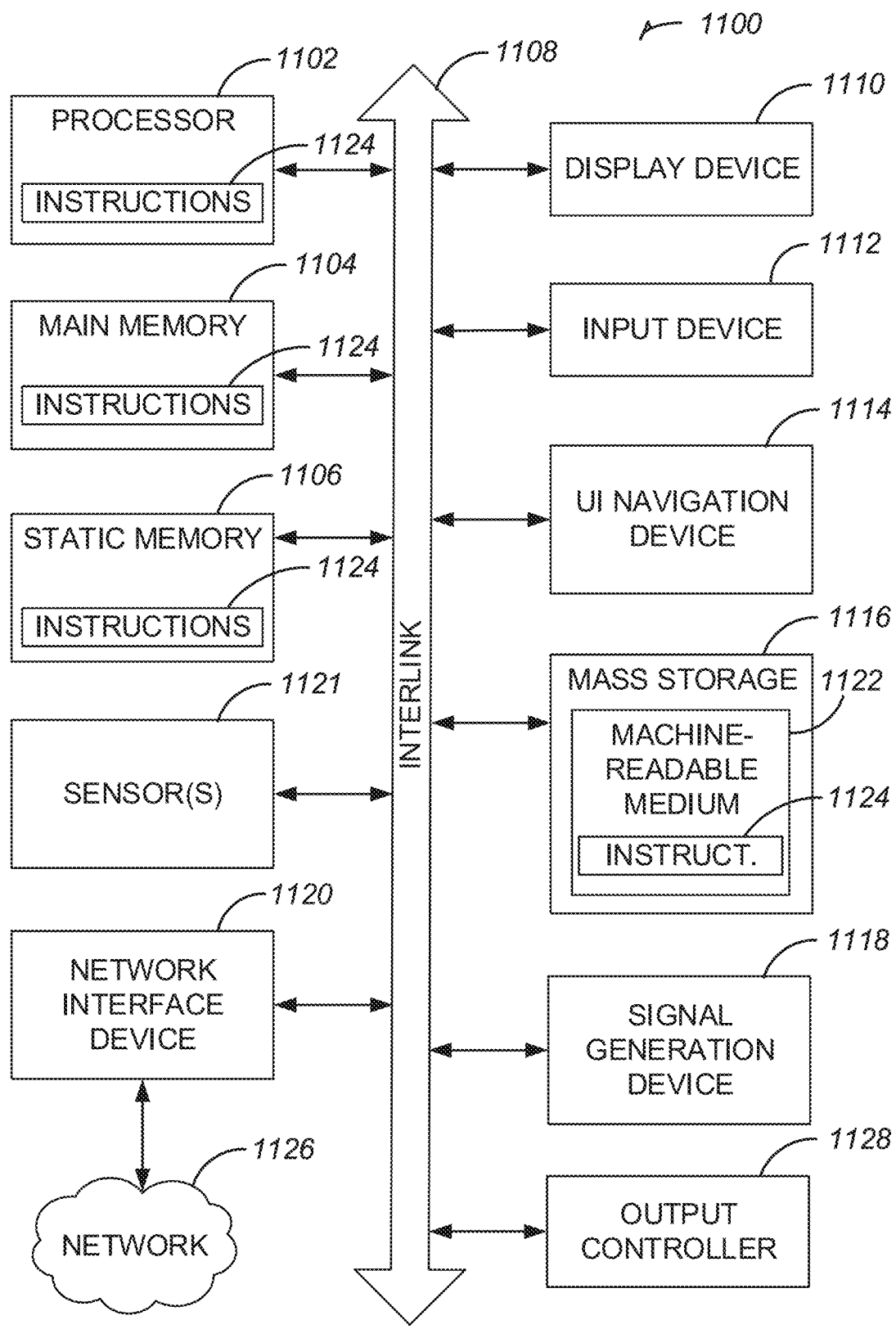
FIG. 11 is a block diagram illustrating an example of a machine upon which one or more embodiments may be implemented.

FIG. 11 illustrates a block diagram of an example machine 1100 upon which any one or more of the techniques (e.g., methodologies) discussed herein may perform. In alternative embodiments, the machine 1100 may operate as a stand- alone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

Example 1 is a wrist-worn apparatus comprising: a strap configured to secure the apparatus on a wrist of a user, wherein an antenna is housed within the strap; and a housing to hold: a transceiver connected to the antenna and configured to communicate in accordance with a radio frequency identification (RFID) family of standards; processing circuitry; and media including instructions that, when executed by the processing circuitry, cause the processing circuitry to: receive, from the transceiver, information from an RFID tag, wherein the RFID tag is within the range of the transceiver; capture a total time the RFID tag is within the range of the transceiver and one or more signal strength measurements between the transceiver and the tag; store, in the media, the total time and signal strength measurements; classify the total time and signal strength measurements; and determine a user interaction based on classification of the total time and signal strength measurements.

In Example 2, the subject matter of Example 1 includes, wherein the apparatus further comprises a speaker in the housing.

In Example 3, the subject matter of Examples 1-2 includes, wherein the instructions further cause the processing circuitry to: convert RFID tag information to an audio playback file; transmit the audio playback file to a speaker of the apparatus for playback.

In Example 4, the subject matter of Examples 1-3 includes, wherein the user interaction is grasping an object.

In Example 5, the subject matter of Examples 1-4 includes, wherein the user interaction is releasing an object.

In Example 6, the subject matter of Examples 1-5 includes, wherein the housing further holds a sensor configured to detect a characteristic of the user.

In Example 7, the subject matter of Example 6 includes, wherein the characteristic includes one of a heart rate, a gesture, or an activity.

In Example 8, the subject matter of Examples 6-7 includes, wherein the instructions further cause the processing circuitry to: receive information from the sensor; determine, using the information from the sensor, a gesture performed by the user; and determine a user interaction with an object by combining the information from the RFID tag and the gesture.

In Example 9, the subject matter of Example 8 includes, wherein the instructions further cause the processing circuitry to determine the user did not interact with an object based on the gesture.

Example 10 is a method comprising: detecting an radio frequency identification (RFID) tag within the range of a localized body network, wherein a localized body network includes, a body network limited to the proximity of a body part; receiving information stored on the RFID tag; determining, based on the information received, that the tag is attached to a moveable object; capturing: a time the tag is within range of the localized body network; and one or more signal strength measurements; classifying the captured time and signal strength measurements; and determining a user interaction for the moveable object based on the time and signal strength measurements.

In Example 11, the subject matter of Example 10 includes, wherein the user interaction is holding the object.

In Example 12, the subject matter of Examples 10-11 includes, wherein the user interaction is releasing the object.

Example 13 is a wrist-worn system comprising: an antenna; at least one memory; a transceiver to communicate with passive radio frequency (RF) devices, wherein the range of the transceiver is limited to an area arranged to cover only a hand and corresponding wrist of a user; processing circuitry to: receive a signal from the transceiver, wherein the signal includes, information received from a passive RF device; and store the information received from the passive RF device in the at least one memory.

In Example 14, the subject matter of Example 13 includes, wherein the processing circuitry may determine an action performed by the user based on the signal.

In Example 15, the subject matter of Examples 13-14 includes, wherein the system is part of a smartwatch.

In Example 16, the subject matter of Examples 14-15 includes, wherein the determined action is holding an object with attached passive RF device.

In Example 17, the subject matter of Examples 14-16 includes, wherein the determined action is touching an object with attached passive RF device.

In Example 18, the subject matter of Examples 14-17 includes, wherein the processing circuitry receives data about the object the passive RF device is attached.

In Example 19, the subject matter of Example 18 includes, wherein the determination of the action performed by the user is based in part on the data received about the object.

In Example 20, the subject matter of Examples 13-19 includes, wherein the wrist-worn system further comprises: a speaker; the processing circuitry further configured to: convert at least part of the information received from the passive RF device to an audio file; transmit the audio file to the speaker.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A wrist-worn apparatus comprising:
    a strap configured to secure the apparatus on a wrist of a user, wherein an antenna is housed within the strap; and
    a housing to hold:
        a transceiver connected to the antenna and configured to communicate in accordance with a radio frequency identification (RFID) family of standards;
        processing circuitry; and
        media including instructions that, when executed by the processing circuitry, cause the processing circuitry to:
            receive, from the transceiver, information from an RFID tag, wherein the RFID tag is within the range of the transceiver;
            capture a total time the RFID tag is within the range of the transceiver and one or more signal strength measurements between the transceiver and the tag;
            store, in the media, the total time and signal strength measurements;
            classify the total time and signal strength measurements; and
            determine a user interaction based on classification of the total time and signal strength measurements.

2. The apparatus of claim 1, wherein the apparatus further comprises a speaker in the housing.

3. The apparatus of claim 1, wherein the instructions further cause the processing circuitry to:
   convert RFID tag information to an audio playback file;
   transmit the audio playback file to a speaker of the apparatus for playback.

4. The apparatus of claim 1, wherein the user interaction is grasping an object.

5. The apparatus of claim 1, wherein the user interaction is releasing an object.

6. The apparatus of claim 1, wherein the housing further holds a sensor configured to detect a characteristic of the user.

7. The apparatus of claim 6, wherein the characteristic includes one of a heart rate, a gesture, or an activity.

8. The apparatus of claim 6, wherein the instructions further cause the processing circuitry to:
   receive information from the sensor;
   determine, using the information from the sensor, a gesture performed by the user; and
   determine a user interaction with an object by combining the information from the RFID tag and the gesture.

9. The apparatus of claim 8, wherein the instructions further cause the processing circuitry to determine the user did not interact with an object based on the gesture.

10. A method comprising:
    detecting an radio frequency identification (RFID) tag within the range of a localized body network, wherein a localized body network includes a body network limited to the proximity of a body part;
    receiving information stored on the RFID tag;
    determining, based on the information received, that the tag is attached to a moveable object;
    capturing:
      a time the tag is within range of the localized body network; and
      one or more signal strength measurements;
    classifying the captured time and signal strength measurements; and
    determining a user interaction for the moveable object based on the time and signal strength measurements.

11. The method of claim 10, wherein the user interaction is holding the object.

12. The method of claim 10, wherein the user interaction is releasing the object.

13. A wrist-worn system comprising:
    an antenna;
    at least one memory;
    a transceiver to communicate with passive radio frequency (RF) devices, wherein the range of the transceiver is limited to an area arranged to cover only a hand and corresponding wrist of a user;
    processing circuitry to:
      receive a signal from the transceiver, wherein the signal includes information received from a passive RF device; and
      store the information received from the passive RF device in the at least one memory.

14. The system of claim 13, wherein the processing circuitry may determine an action performed by the user based on the signal.

15. The system of claim 13, wherein the system is part of a smartwatch.

16. The system of claim 14, wherein the determined action is holding an object with attached passive RF device.

17. The system of claim 14, wherein the determined action is touching an object with attached passive RF device.

18. The system of claim 14, wherein the processing circuitry receives data about the object the passive RF device is attached.

19. The system of claim 18, wherein the determination of the action performed by the user is based in part on the data received about the object.

20. The system of claim 13, wherein the wrist-worn system further comprises:
    a speaker;
    the processing circuitry further configured to:
      convert at least part of the information received from the passive RF device to an audio file;
      transmit the audio file to the speaker.

* * * * *